Dec. 1, 1959

A. G. WALSH 2,915,384

METHOD OF PRODUCING ZIRCONIUM

Filed Oct. 2, 1956

INVENTOR.
Arthur G. Walsh
BY
Oliver W. Hoyes

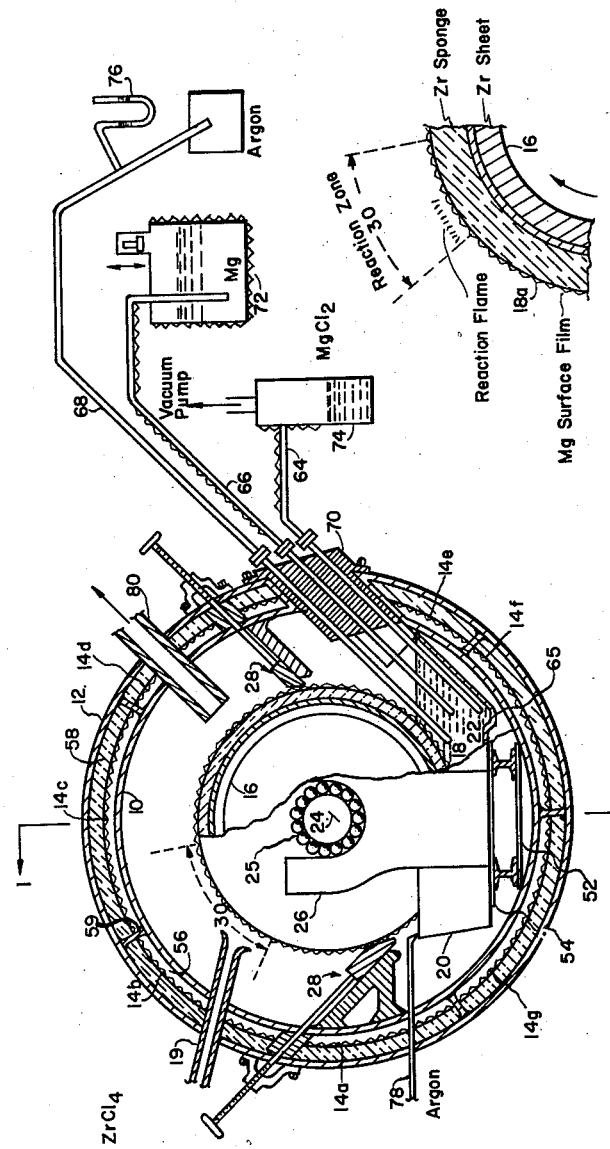

United States Patent Office 2,915,384
Patented Dec. 1, 1959

2,915,384

METHOD OF PRODUCING ZIRCONIUM

Arthur G. Walsh, Weston, Mass., assignor to National Research Corporation, Cambridge, Mass., a corporation of Massachusetts Application October 2, 1956, Serial No. 613,438

3 Claims. (Cl. 75—84.5)

This invention relates to the production of metals and more particularly to the production of a refractory metal such as zirconium by reduction of a refractory metal halide with a metallic reducing agent such as an alkali metal or an alkaline earth metal. In particular the invention is directed to improvements in the so-called "Kroll" process which has been widely adapted for the commercial production of zirconium. Accordingly, the present invention will be primarily discussed in connection with its applicability to the production of zirconium by the reduction of zirconium tetrachloride with magnesium. The present commercial processes for the production of zirconium by the so-called "Kroll" process has been well described in the excellent text, "Metallurgy of Zirconium," Lustman and Kerze, National Nuclear Energy Series, vol. 4, McGraw-Hill, 1955. The disadvantages of these present commercial reaction techniques are numerous. The yield of metal of acceptable quality is relatively low, the percentage contamination is high, the production of zirconium per unit volume of reactor is low and the reaction is slow. Despite numerous proposed improvements, the commercial "Kroll" process is essentially a batch reaction in which a bucket of molten magnesium is slowly converted to a mass of zirconium sponge, only a portion of which is acceptably pure.

Accordingly, it is a principal object of the present invention to provide an improved apparatus and process for producing refractory metals such as zirconium.

Still another object of the invention is to provide an improved apparatus which is semi-continuous in nature, i.e., permits semi-continuous introduction of the reactants, and intermittent removal of the by-product.

Another object of the invention is to provide an improved apparatus and process permitting much shorter cycle times per unit of metal produced.

Still another object of the invention is to provide an improved apparatus and process giving higher yields of an acceptable product.

Other objects of the invention will in part be obvious and will in part appear hereinafter.

For a fuller understanding of the nature and objects of the invention, reference should be had to the following detailed description taken in connection with the accompanying drawings, wherein:

Fig. 2 is a fragmentary sectional view of the apparatus of Fig. 1 taken along the line 2—2.

Fig. 3 is a fragmentary exploded view of a portion of the apparatus of Fig. 2.

Figure 1:
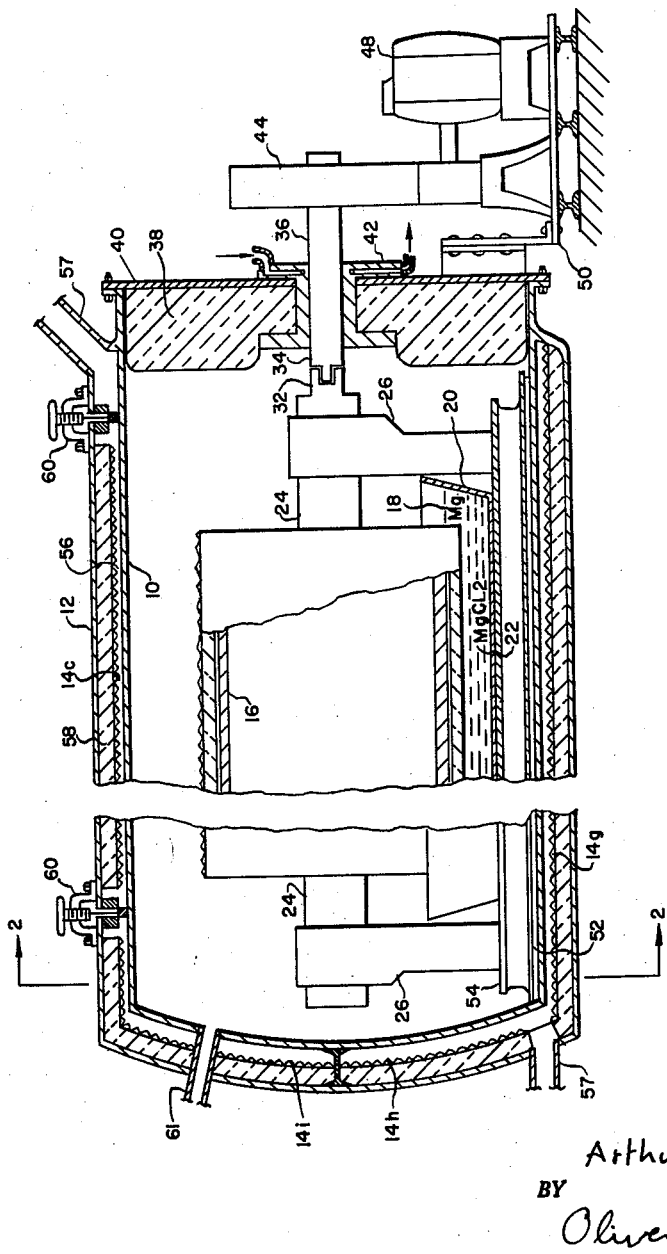
Fig. 1 is a schematic, diagrammatic sectional view of one embodiment of the invention.

The present invention, as mentioned previously, will be described in connection with its applicability to the production of zirconium without intent to limit the scope thereof. The apparatus includes a reaction chamber within which an appreciable partial pressure of zirconium tetrachloride vapors can be created. This may be accomplished by vaporizing zirconium tetrachloride externally of the reaction surface and feeding the vapors into the reaction chamber. Within this reaction chamber is provided a reaction zone which is heated to the ignition temperature for the reaction between zirconium tetrachloride and the reducing agent, e.g. magnesium. This ignition temperature is on the order of 850°–900° C. when an appreciable partial pressure of inert gas (e.g. argon or helium) is also present in the reaction zone.

A supply of molten magnesium is also provided in the reaction chamber, the supply preferably being in the form of a molten pool of magnesium positioned near the bottom of the reaction chamber. This molten pool is maintained at a temperature below the ignition temperature of the reaction between the zirconium tetrachloride vapors and magnesium, so as to prevent reaction between the surface of the molten magnesium and any zirconium tetrachloride vapors which may be in contact with the molten magnesium surface. The magnesium is carried from the pool to the reaction zone by means of a metallic surface which is moved alternately between the magnesium pool and the reaction zone. The magnesium wets the metallic surface and is carried thereby as the surface moves up to the reaction zone. As the wetted surface enters the reaction zone, the molten magnesium on the surface is heated to its ignition temperature and the zirconium tetrachloride vapors in contact with this surface are reduced to metallic zirconium which adheres to the metallic surface. As the surface is moved back to the magnesium pool, any by-product magnesium chloride which has not already run off the surface is displaced by the magnesium which again wets the surface to form a fresh wetted surface of magnesium on the freshly deposited zirconium. This surface is again moved into the reaction zone and another layer of zirconium is deposited on the previous zirconium layer.

In one preferred embodiment of the invention the movable metallic metal surface comprises a cylinder or drum which actually floats on the pool of molten magnesium, the axis of the cylinder being preferably horizontal. As the cylinder rotates around its axis, molten magnesium is carried from the relatively low temperature pool up into the higher temperature reaction zone where the magnesium temperature is raised sufficiently so that it will react with zirconium tetrachloride vapors in the reaction zone. The cylinder is preferably formed of a metal having a high strength at high temperature, such as stainless steel, and the circumferential surface of the drum is preferably covered with a sheet of zirconium so that even the initially formed zirconium is deposited on a zirconium surface.

The upper surface of the drum is preferably heated by radiation to a temperature several hundred degrees hotter than the temperature of the molten magnesium pool. Additionally, radiant heat shields are included to prevent the undue heating of the magnesium pool surface.

While it is possible that some reaction can take place between the zirconium tetrachloride vapors and the lower temperature magnesium in the pool, the fact that the great majority of the reaction takes place in the reaction zone is due to several factors. In the first place, the much higher temperature of the molten magnesium in the reaction zone provides an enormously higher reaction rate with the zirconium tetrachloride in the reaction zone than at the molten pool surface and this high temperature magnesium acts to "getter" the zirconium tetrachloride vapors adjacent the reaction zone. Secondly, the zirconium tetrachloride is preferably introduced into the reaction chamber near the reaction zone so that it will tend to be consumed at the reaction zone rather than at the pool surface. Additionally, a preferred embodiment includes a stream of argon flowing from the magnesium pool surface past the heat baffles towards the reaction zone, thereby discouraging random diffusion of the zirconium tetrachloride vapors towards the pool surface. Accordingly, all of these factors contribute to localizing the reaction at the reaction zone on the high temperature magnesium film on the drum surface.

Throughout the specification and claims it is found convenient to refer to the "ignition temperature" for the reaction between magnesium and the zirconium tetrachloride. In the strict sense, thermal data indicate some reaction between magnesium and zirconium tetrachloride at temperatures as low as 400°–500° C. However, the reaction rate at these lower temperatures is so low that it can, for all practical purposes, be ignored. Accordingly, by "ignition temperature" of the reaction between zirconium tetrachloride and magnesium is meant the temperature at which a thin film of magnesium will start to burn in an atmosphere having a partial pressure (e.g. ½ atmosphere) of zirconium tetrachloride which exists in the reaction zone. The "ignition temperature" will vary inversely with the partial pressure of the zirconium tetrachloride and also seems to be affected by the thinness of the magnesium film. This "ignition temperature" appears to be somewhat lower for a thin wetted film of magnesium than for a pool of magnesium.

Referring now to the drawings there is shown one preferred embodiment of the invention wherein like numbers refer to like elements in the various figures. The apparatus includes an inner reaction chamber 10 positioned within a furnace 12 suitably provided with a number of heaters indicated at 14a, 14b, etc. The reaction chamber 10 also includes a rotary drum 16 positioned so that it partially floats on a pool of magnesium 18. Zirconium tetrachloride vapors are introduced to the reaction chamber 10 by means of a plurality of heated pipes one of which is indicated at 19 (see Fig. 2) connected to a suitable vaporizer, which is not illustrated in the drawings. The magnesium pool 18 is confined in a tub 20 which also supports a layer 22 of magnesium chloride which is the by-product of the reduction reaction and which, being heavier than the magnesium settles to the bottom of the tub. The drum 16 is supported by axles 24 which are held in open bearings 26. In a preferred embodiment rollers 25 are included between the axles 24 and the bearings 26. Heat shields 28 are provided over the molten pool of magnesium so as to prevent excess transfer of radiant heat from the top part of the reaction chamber down to the molten pool. Portions of the heat shields 28 can be moved away from the drum so as to permit close positioning of the shields at all times, despite growth of the drum diameter. These shields are particularly necessary due to the high temperature in the hot reaction zone indicated schematically at 30 in Fig. 2. In the preferred embodiment of the invention the axle 24 at one end of the drum 16 is provided with a yoke 32 arranged to engage a cooperative yoke 34 carried by a shaft 36 which extends through a mass of insulation 38 supported by an outer door 40. The shaft 36 is supported in a vacuum-tight, water-cooled bearing 42 and is driven by a reduction gear 44 powered by a motor 48 carried by a pallet 50 so as to rotate drum 16 at a fractional r.p.m. This pallet 50 preferably also supports the door 40, the shaft 36 and insulator 38 to permit moving the whole arrangement to and from the position shown in Fig. 1.

The bearings 26 are shown extending downwardly to another pallet arrangement 54 which is positioned on a furnace hearth 52. By this arrangement, when the door 40 has been moved away from the furnace, the whole structure comprising the drum 16, the tub 20 and pallet 54 can be moved onto or removed from the hearth 52 by means of a fork lift truck of conventional construction.

The furnace 12 which surrounds the reaction chamber 10 has a plurality of heaters 14a, 14b, etc. These heaters are positioned in heat passages 56 which are insulated from the outer metallic surface 12 by means of layers of insulation 58. The individual passages are isolated from each other by partitions schematically shown at 59. This arrangement in conjunction with control units for the heaters, 14a, 14b, etc., permits individual control of the radiation surface of the reaction chamber wall 10 adjacent to each heater. Thus during various portions of the operating cycles the circumferential temperature in the reaction chamber 10 can be closely controlled so as to provide zones of different temperature when such are desired. To assist in cooling portions of the furnace when it is desired to remove heat, pipes 57 are provided for permitting flow of cooling air through various furnace sections 56. This flow of cooling air is controlled by suitable valves 60 at the ends of these furnace sections 56.

Whenever it is desired to operate the internal reaction chamber 10 with a subatmospheric pressure the space between reaction zone 10 and furnace 12 may be evacuated by means of one of the vent pipes 57 so as to provide a negligible pressure drop across the hot reaction chamber wall 10. The interior of the reaction chamber 10 can be evacuated by means of a pumping port 61 connected to a suitable vacuum pumping system (not shown).

In a preferred embodiment of the invention a tube 64 is provided which can be dipped down into a well 65 preferentially provided in the bottom of the tub 20 so as to permit periodic withdrawal of molten magnesium chloride. The invention also preferably includes another tube 66 through which magnesium can be periodically added to the molten pool 18 thereof. Tubes 64 and 66 are arranged to be heated to a high temperature to prevent freezing of the liquids therein. An argon bubbler tube 68 is also provided for determining the level of the surface of the magnesium pool. These three tubes 64, 66 and 68 are preferably carried in a single seal 70 which extends through the side of the reaction chamber 10 and furnace 12. The entire tube and seal assembly is removable, thus permitting the tub to be moved into the reaction chamber and removed therefrom without interference with the tubes. By this arrangement an empty reaction tub 20 can be placed into the reaction chamber while the furnace is relatively cold, seal 70 can then be inserted into the furnace 12 to position the tubes 64, 66 and 68 as shown in Fig. 2 and the tub 20 can be filled with a charge of molten magnesium from a suitable supply 72 thereof. After reaction has proceeded for a considerable time, magnesium chloride can be withdrawn from the well 65 by evacuating a reservoir 74 so as to provide a pressure difference between the molten pool of magnesium chloride and the reservoir to cause a flow of molten magnesium chloride out through the tube 64. The level of magnesium can be measured continuously by means of a gauge 76 connected to the argon bubbler tube 68.

In a preferred embodiment of the invention the hot portions of the reaction chamber 10 are preferably formed of stainless steel, as is the rotary drum 16. The bearings 26 and tub 20 can be formed of cast iron. The roller bearings 25 may be formed of a suitable high temperature alloy. The various tubes 64, 66 and 68 are preferably formed of stainless steel. The heat shields 28 are preferably of stainless steel inclosing a suitable insulating refractory. As shown in the enlarged view (Fig. 3) the stainless steel drum 16 is preferably covered with a sheet of zirconium prior to use in the reaction chamber so as to prevent adhering of the forming zirconium sponge to the stainless steel drum. If desired, the drum can be slightly tapered to assist in the removal of the zirconium sheet with a layer of zirconium sponge on the outer surface thereof. However, the coefficients of expansion of the stainless steel and zirconium are sufficiently different so that the stainless steel should shrink away from the zirconium sheet during cooling to greatly facilitate removal of the zirconium sheet.

In another preferred embodiment of the invention the magnesium in the pool 18 is maintained at a temperature just above the melting point of magnesium chloride (i.e. about 725° C.). However, the reaction zone 30, Fig. 2, is maintained sufficiently hot so that the magnesium which wets the surface of the zirconium sponge is heated to a temperature on the order of 850°–900° C. As the magnesium film enters the hot reaction zone it ignites and forms an additional layer of zirconium sponge on top of the previously deposited zirconium. The byproduct magnesium chloride runs off the surface of the drum and flows into the tub 20 where it sinks below the surface of the magnesium pool down to the layer 22.

During the reduction operation a supply of argon, or other inert gas, is preferably introduced by means of a plurality of pipes, one of which is indicated at 78, so as to provide a very gentle flow of argon across the surface of the magnesium pool 18 and up behind the baffles 28. This flow of argon from the magnesium pool toward the point of introduction of the zirconium chloride prevents random diffusion of the zirconium chloride down into contact with the magnesium pool.

In a preferred embodiment of the invention zirconium chloride vapors are introduced at a sufficiently fast rate to maintain an appropriate partial pressure of zirconium tetrachloride vapors in the reaction zone 30. Argon is continually removed from the reaction chamber by means of pipe 80 so as to maintain the reaction chamber under a total pressure on the order of one atmosphere.

In operation of the invention an empty tub 20 and a cylinder 16 carrying a sheet zirconium covering are placed in the furnace 10. The tubes 64, 66 and 68 are placed into the positions shown and the furnace is sealed. It is then heated somewhat and the reaction chamber 10 is evacuated to pump out all the air and any residual moisture. The reaction chamber 10 is then flooded with argon and the heat is raised so that the whole furnace is brought up to a temperature above the condensation temperature (331° C.) of zirconium tetrachloride. Thereafter heaters 14a, 14e, 14f and 14g bring the lower portion of the furnace to slightly above the melting point (712° C.) of magnesium chloride. Heaters 14c and 14d can maintain their corresponding sections of the furnace at a temperature of about 500° C. to permit some cooling of the drum by radiant heat transfer therefrom. Heater 14b preferably raises its portion of the furnace to a temperature on the order of 950° C. to 1000° C. Heaters 14h and 14i are kept above the condensation temperature of the $ZrCl_4$. When the furnace has reached its operation temperature, a charge of magnesium is run into tub 20 through the tube 66 and the argon bubbler 68 is started. Argon flow through the pipe 78 is also commenced. Rotation of the drum at a slow speed is started and zirconium tetrachloride vapors are fed into the reaction zone through the pipes 19, along with some argon which serves as a carrier gas. The reaction takes place in the reaction zone at the magnesium wetted surface of the sponge 18a as shown in Fig. 3. During the operation argon is continually being removed through the pipe 80, any residual zirconium tetrachloride vapors being condensed and argon being recycled to pipes 19 or 78. The magnesium chloride is periodically removed, as necessary, to prevent overflowing of the tub 20. Heat shields 28 are slowly moved away from the drum surface to accommodate the increasing drum diameter. When about 6 to 12 inches of zirconium sponge have been built up on the drum 16, all of the magnesium chloride and magnesium in the tub 20 is pumped out through the tube 64. Thereafter, the reaction chamber 10 and the oven 12 are evacuated and the whole reaction chamber is heated to a temperature on the order of 850° C. to vaporize any residual magnesium and magnesium chloride in the reaction chamber or in the formed sponge. These vapors pass out of the reaction chamber through the evacuation pipe 61 and into a condenser (not shown). Thereafter, the reaction chamber is again filled with argon; all of the heaters are turned off; and the furnace is cooled to room temperature. If desired, the magnesium sponge can be "conditioned" before opening the reaction chamber to the atmosphere by bleeding in small quantities of air after the sponge has reached room temperature. Thereafter, the drum 16, tub 20 and the associated equipment are removed from the furnace. The zirconium sheet, with its attached sponge, is then removed from the drum and the sponge is chopped up and melted into ingot form.

While one preferred embodiment of the invention has been described above, numerous modifications thereof can be made without departing from the scope of the invention. For example, the drum 16 can take numerous different shapes and can be replaced by a plurality of discs carried on a horizontal shaft, the discs dipping into the magnesium pool at the bottom of their travel and being heated to the "ignition temperature" at the top of their travel. With such modifications of the metal surface to be wetted by the magnesium numerous other changes, particularly in the heat shields 28 must be made.

Numerous other reducing agents such as alkali metals and other alkaline earth metals can be employed. Similarly mixed reducing agents can be used, particularly when it is desired to lower the melting point of the byproduct chloride so as to accommodate a lower "ignition temperature" for the reaction between the reducing agent and the halide of zirconium or other metal which is to be reduced. While it is preferred to keep the pool of reducing agent well below the "ignition temperature," this requirement can be relaxed considerably in those cases where high argon flow rates are employed to prevent diffusion of the vapors of the reducible halide down to the reducing agent pool, thus preventing reaction at the pool surface.

While the illustrated embodiment of the invention contemplates the feed of zirconium tetrachloride vapors to the reaction chamber, it is equally possible to feed solid zirconium tetrachloride to a portion of the reaction chamber where it is vaporized upon entering the chamber, the resulting vapors being directed to the reaction zone. One method of achieving this solid feed is described and claimed in the copending application of Hnilicka, Serial No. 600,483, filed July 27, 1956, now abandoned.

Since certain changes may be made in the above process without departing from the scope of the invention herein involved, it is intended that all matter contained in the above description or shown in the accompanying drawings shall be interpreted as illustrative and not in a limiting sense.

What is claimed is:

1. In a process for producing zirconium by reduction of zirconium tetrachloride wherein an atmosphere containing a partial pressure of a zirconium tetrachloride is provided in a reaction zone in a reaction chamber, and is reduced to zirconium metal by reaction with liquid metal reducing agent selected from the group consisting of the alkali metals and the alkaline earth metals, the improvement which comprises holding a supply of liquid metal reducing agent at a temperature below the ignition temperature for the reaction between the reducing agent and the zirconium tetrachloride, providing a metallic surface of extended area, moving portions of said surface into and out of said supply of liquid metal to first wet said surface with said liquid metal and then to move the surface into said atmosphere of zirconium tetrachloride, and heating portions of the wetted surface to the ignition temperature of the reduction reaction after said portions have been moved into said reaction zone a substantial distance away from the supply of molten reducing agent.

2. In a process for producing zirconium by reduction of zirconium tetrachloride with magnesium the improvement which comprises confining a pool of magnesium in a reaction chamber, dipping a zirconium surface into the magnesium pool to wet the surface with a thin film of molten magnesium, moving the wetted surface into a reaction zone spaced from the pool, maintaining an atmosphere of zirconium tetrachloride vapors in the reaction zone, heating the wetted surface to a temperature on the order of 900° C. as it moves into the reaction zone to promote the reduction reaction, maintaining the magnesium pool below about 800° C., and repeating the alternate dipping and reaction until a substantial mass of zirconium is formed.

3. In a process for producing zirconium by reduction of zirconium tetrachloride with magnesium the improvement which comprises confining a pool of magnesium in a reaction chamber, dipping a zirconium surface into the magnesium pool to wet the surface with a thin film of molten magnesium, moving the wetted surface into a reaction zone spaced from the pool, feeding zirconium tetrachloride vapors into the reaction zone, maintaining a partial pressure of an inert gas in the reaction chamber, heating the wetted surface to a temperature on the order of 900° C. as it moves into the reaction zone to promote the reduction reaction, maintaining the magnesium pool below about 800° C., and repeating the alternate dipping and reaction until a substantial mass of zirconium is formed, and flowing inert gas from the pool surface towards the reaction zone.

References Cited in the file of this patent

UNITED STATES PATENTS

| 1,530,154 | Caspari | Mar. 17, 1925 |
| 2,205,854 | Kroll | June 25, 1940 |
| 2,781,257 | Wilkins | Feb. 12, 1957 |

FOREIGN PATENTS

| 143,435 | Australia | Sept. 17, 1951 |